United States Patent [19]

Endo

[11] 4,221,896
[45] Sep. 9, 1980

[54] ROOM TEMPERATURE CURABLE COMPOSITION

[75] Inventor: Isao Endo, Ohta, Japan

[73] Assignee: Toshiba Silicone Co., Ltd., Tokyo, Japan

[21] Appl. No.: 19,648

[22] Filed: Mar. 12, 1979

[30] Foreign Application Priority Data

Mar. 30, 1978 [JP] Japan .................................. 53-36983

[51] Int. Cl.$^2$ ............................................. C08G 77/04
[52] U.S. Cl. ................................. 528/28; 260/37 SB;
528/33; 528/34; 528/38; 528/68; 528/85;
528/901; 428/447
[58] Field of Search ...................... 528/28, 33, 34, 38,
528/901, 68, 85; 260/37 SB

[56] References Cited

U.S. PATENT DOCUMENTS

| 3,179,622 | 4/1965 | Haluska | 528/28 |
| 4,075,154 | 2/1978 | Itoh et al. | 528/33 |

Primary Examiner—Melvyn I. Marquis

Attorney, Agent, or Firm—Blanchard, Flynn, Thiel, Boutell & Tanis

[57] ABSTRACT

A room temperature curable polyorganosiloxane composition which comprises (A) 100 parts by weight of α,ω-dihydroxypoly(diorganosiloxane) having a viscosity of 20 to 1,000,000 cp measured at 25° C. and being represented by the following general formula:

$$HO(R^1{}_2SiO)_nH$$

wherein $R^1$ stands for a monovalent substituted or unsubstituted hydrocarbon group and two $R^1$ groups may be the same or different, and n is a number satisfying said requirement of the viscosity, (B) 0.1 to 30 parts by weight of an aminoxy group-containing organic silicon compound having at least two organoaminoxy groups on the average in the molecule, and (C) 0.001 to 20 parts by weight of a compound having at least one isocyanate group in the molecule.

19 Claims, 1 Drawing Figure

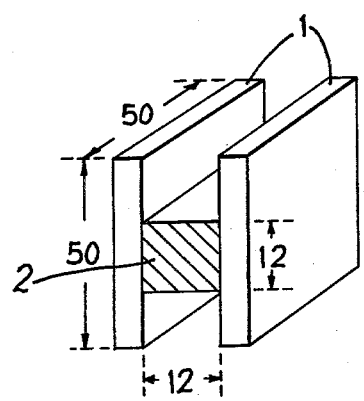

ROOM TEMPERATURE CURABLE COMPOSITION

The present invention relates to a room temperature curable polyorganosiloxane composition (RTV silicone) having an improved storage stability, which is comprised of an α,ω-dihydroxypoly(diorganosiloxane) which is cross-linked to form a rubbery elastomer by an organic silicon compound having at least two aminoxy groups on the average in the molecule.

Further, the present invention relates to a two-pack type room temperature curable polyorganosiloxane composition comprising a component composed mainly of an α,ω-dihydroxypoly(diorganosiloxane) and a component composed mainly of an organoaminoxy group-containing organic silicon compound, wherein the two components are mixed at the time of application. Moreover, the present invention also relates to a one-pack type room temperature curable polyorganosiloxane composition consisting essentially of an α,ω-dihydroxypoly(diorganosiloxane) and an organoaminoxy group-containing organic silicon compound, which composition is liquid or plastic while it is stored out of contact with moisture, but which is cured to form a rubbery elastomer when it is exposed to moisture.

Room temperature curable polyorganosiloxane elastomers (called "RTV silicone rubber") are widely used as sealing materials for construction, because they are excellent in weatherability, durability, heat resistance and cold resistance and their physical properties are scarcely changed by the influence of temperature and they are scarcely degraded by ozone, ultraviolet radiation and the like. Polyorganosiloxane elastomers of the type that release acetic acid during cure have mainly been used in this application field. However, in the case of these polyorganosiloxane elastomers, a satisfactory adhesiveness to concrete or mortar is not obtained even if a primer coating treatment is carried out. Moreover, corrosion of underlying metal substrates is often caused by the released acetic acid. Accordingly, it has been desired to solve these problems. The foregoing disadvantages has been eliminated by the development of polyorganosiloxane elastomers of the oxime-releasing and alcohol-releasing types. However, when these elastomers are employed, the modulus is high and the elongation at break is about 600% at the highest, and therefore, they are not satisfactory as sealing materials for multistory buildings. In multistory buildings, in order to absorb vibrations and tremors of earthquakes and the like, the sealing materials are required to have a low modulus and a high elongation at break. Conventional polyorganosiloxane elastomers of the oxime-releasing and alcohol-releasing types fail to satisfy these requirements, and hence, their range of utility is naturally limited.

Japanese Patent Publication No. 24545/68 discloses a low-modulus, high-elongation, polyorganosiloxane elastomer sealing material which is composed of a polyorganosiloxane elastomer of the hydroxylamine-releasing type comprising an α,ω-dihydroxypoly(diorganosiloxane) and an aminoxy group-containing silicon compound. According to this proposal, by adjusting the ratio of the bifunctional aminoxy group-containing silicon compound to the trifunctional aminoxy group-containing silicon compound, a low-modulus, high-elongation, sealing material can be obtained. This is an advantage of this proposal.

In sealing materials based on this cross-linking mechanism, there are actually used only two-pack type compositions in which the α,ω-dihydroxypoly(diorganosiloxane) and the aminoxy group-containing organic silicon compound are separately stored up to the time of use and at the time of application, both the components are mixed to effect curing at room temperature. Products of this type have the serious defect that it is very difficult to mix the two components at a predetermined ratio with assured success at construction sites where the working conditions are very bad. Accordingly, it has been eagerly desired to make uniform the size and shapes of packages of the two components and to adjust the mixing ratio to substantially 1:1. However, the aminoxy group-containing organic silicon compound is very unstable, and when a two-pack type composition having good workability, physical properties and curing properties is formed, the mixing ratio is inevitably within the range of from 100:1 to 100:3. Accordingly, it is impossible to satisfy the above desire. Various efforts have heretofore been made to increase the quantity of the aminoxy group-containing organic silicon compound in order to make the mixing ratio to be about 1:1. For example, there has been proposed a method in which this organic silicon compound is diluted and a method in which an appropriate filler is incorporated therein. However, if either of such methods is adopted, the stability is degraded, and when the composition is stored for a long time, the workability, physical properties and curing characteristics are changed and the commercial value is reduced. Further, when an organic substance such as an ether, is used as a stabilizer, a certain improvement of the stability can be attained, but since the boiling point of the additive compound is low, the risk of ignition is increased and a reduction of the dimensions of the cured composition occurs. Still further, this silicone elastomer sealing material of the hydroxylamine-releasing type has a property of corroding metals, although the corrosive action is not as strong as that of the silicone elastomer sealing material of the acetic acid-releasing type.

Furthermore, it has heretofore been desired to provide a one-pack type composition of this type. In the one-pack type composition, errors will not occur in the weighing and mixing operations and such troublesome operations as the mixing operation can be omitted, and various advantages can be attained with respect to the operation time, physical properties and appearance characteristics. Therefore, it has been eagerly desired to develop a so-called one-pack type composition in which an α, ω-dihydroxypoly(diorganosiloxane) and a cross-linking agent are stored in one vessel in a moisture-insulated state, as in case of conventional sealing materials of the acetic acid-releasing, oxime-releasing and alcohol-releasing types, and curing is performed by exposure to air containing moisture. However, according to the conventional techniques, when the α,ω-dihydroxypoly(diorganosiloxane) is mixed with the aminoxy group-containing organic silicon compound, it is impossible to prevent the occurrence of the hydroxylamine-releasing reaction and the siloxane-cutting reaction, and even if the mixture is stored in a moisture-insulated state, curing is completed in 2 to 3 hours or reduction of the viscosity is caused in the sealed vessel. Further, it sometimes happens that when the mixture is exposed to air, curing does not advance to such an extent that a desired hardness is obtained. Accordingly, it has been impossible to provide a one-pack type composition for a hydroxylamine-releasing polyorganosiloxane of this type.

Recently, methods have been proposed for solving the above problem and providing a one-pack type composition by converting the organic hydroxylamine generated in the system into a harmless substance by chemical reaction or by adding an additive capable of adsorbing the organic hydroxylamine. For example, Japanese Patent Application Laid-Open Specification No. 32949/77 proposes a method in which an aluminosilicate is used as an adsorbent. In this method, the stability of the composition can be improved but the curing speed is lowered. There is also known a method in which a compound having an SiH linkage is added and it is reacted with the organohydroxylamine in order to improve the stability. This method, however, involves a problem of foaming or bubble formation due to generation of hydrogen gas.

We have noted that all of the foregoing problems are caused by an organohydroxylamine which is present in the system in a small amount. We have conducted research with a view to developing a method for effectively removing this organohydroxylamine. As a result, we have found that this object can be completely attained by the addition of an isocyanate group-containing compound. More specifically, we have found that, in the case of a two-pack type composition, by incorporating an isocyanate group-containing compound into the aminoxy group-containing organic silicon compound, a high stabilizing effect can be attained and by further addition of a polyorganosiloxane, an organic solvent and a filler, the amount of the component containing the aminoxy group-containing organic silicon compound can be increased and the storage stability can be highly improved over the conventional techniques. We have also discovered that in the case of a one-pack type composition, good stability for long-time storage can be attained and the physical properties and curing characteristics can be remarkably stabilized. In conventional compositions of this type, because of poor adhesiveness, an appropriate primer should also be used when the compositions are applied to uses where adhesiveness is required. We have also found that a self-adhering property can be imparted to the composition by incorporating therein an isocyanate group-containing compound.

More specifically, in accordance with the present invention, there is provided a room temperature curable composition which consists essentially of (A) 100 parts by weight of an $\alpha,\omega$-dihydroxypoly(diorganosiloxane) having a viscosity of 20 to 1,000,000 cp measured at 25° C. and being represented by the following general formula:

$$HO(R^1{}_2SiO)_nH$$

wherein $R^1$ stands for a monovalent substituted or unsubstituted hydrocarbon group and two $R^1$ groups may be the same or different, and n is a number satisfying the viscosity requirement, (B) 0.1 to 30 parts by weight of an aminoxy group-containing organic silicon compound having at least two organoaminoxy groups on the average in the molecule, and (C) 0.001 to 20 parts by weight of a compound having at least one isocyanate group in the molecule.

The $\alpha,\omega$-dihydroxypoly(diorganosiloxane) that is used as the component (A) in the present invention is represented by the following general formula:

$$HO(R^1{}_2SiO)_nH$$

wherein $R^1$ and n are as defined above, and it has a viscosity of 20 to 1,000,000 cp measured at 25° C. As the group $R^1$, there can be mentioned, for example, monovalent hydrocarbon groups such as methyl, ethyl, propyl, butyl, vinyl and phenyl groups, and monovalent substituted hydrocarbon groups such as chloromethyl, cyanoethyl and 3,3,3-trifluoropropyl groups. These $R^1$ groups can be the same or different. In order to obtain a sealing material which is excellent in the required properties, such as high weatherability, appropriate curing speed and appropriate flowability before curing, it is preferred that at least 85% of the $R^1$ groups are methyl groups. From the viewpoints of these properties and ease of synthesis of the $\alpha,\omega$-dihydroxypoly(diorganosiloxane), it is especially preferred that all of the $R^1$ groups are methyl groups. When high cold resistance or heat resistance is required, it is recommended to use phenyl groups as part of the $R^1$ groups. The value of n is determined in the light of the desired ease in handling, the flow characteristics of the composition and the physical properties of the sealing material formed by curing the composition so that the viscosity of the $\alpha,\omega$-dihydroxypoly(diorganosiloxane) is in the range of from 20 to 1,000,000 cp measured at 25° C. The value of n varies depending on the kind and mole ratio of the $R^1$ groups. For example, when all of the $R^1$ groups are methyl groups, the value of n is in the range of from 20 to 3,000. It is preferred that the viscosity be 100 to 100,000 cp, especially 500 to 50,000 cp, measured at 25° C. When the viscosity is below the above range, a low modulus and a good elongation at break, required of a sealing material, cannot be obtained, and when the viscosity is too high, no good workability is attained.

The aminoxy group-containing organic silicon compound that is used as the component (B) in the present invention causes a hydroxylamine-releasing reaction with terminal silanol groups of the $\alpha,\omega$-dihydroxypoly(diorganosiloxane) (A) to effect cross-linking of the polysiloxane and chain extension thereof. This organic silicon compound can be any of (1) silane derivatives and (2) linear, cyclic and branched siloxane derivatives. In order to attain a good reactivity and to provide a low-modulus, high-elongation sealing material, it is preferred to use the combination of a cyclic polysiloxane having two aminoxy groups in the molecule and a cyclic polysiloxane having three aminoxy groups in the molecule. As the organic group bonded to the aminoxy group, there can be mentioned, for example, two monovalent hydrocarbon groups selected from methyl, ethyl, propyl, butyl, cyclohexyl and other groups, and one divalent hydrocarbon group selected from butylene, pentene and other groups. From the viewpoints of easy availability of the starting compound, ease in the synthesis, reactivity and easy evaporation of the released organohydroxylamine, an ethyl group is especially preferred. Examples of the aminoxy group-containing silicon compound are described below. The following abbreviations will be hereinafter used for simplification of the description.

Abbreviations:
Me: methyl group
Et: ethyl group

Bu: butyl group
Vi: vinyl group
Ph: phenyl group.

Examples of Aminoxy Group-Containing Organic Silicon Compound:

Si(ONEt$_2$)$_4$, MeSi(ONEt$_2$)$_3$, PhSi(ONMe$_2$)$_3$, PhSi(ONEt$_2$)$_3$,

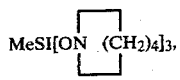

Et$_2$NOMe$_2$SiSiMe$_2$ONEt$_2$, Et$_2$NOMe$_2$SiOSiMe$_2$ONEt$_2$, Et$_2$NOMe$_2$SiOPh$_2$SiOSiMe$_2$ONEt$_2$,

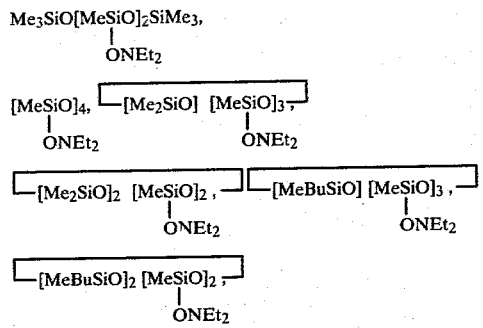

MeSi[OMe$_2$SiONEt$_2$]$_3$ and PhSi[OMe$_2$SiONEt$_2$]$_3$.

The aminoxy group-containing organic silicon compound is incorporated in an amount of 0.1 to 30 parts by weight, preferably 1 to 20 parts by weight, per 100 parts by weight of the α,ω-dihydroxypoly(diorganosiloxane) (component A). When the amount of the aminoxy group-containing organic silicon compound is less than 0.1 part by weight, the speed of the reaction with the α,ω-dihydroxypoly(diorganosiloxane) (A) is increased and a satisfactory one-pack type product cannot be formed. Further, even if the case of a two-pack type product, a sufficient operation time cannot be obtained, and the storage stability and curing property are degraded.

The isocyanate group-containing compound that is used as the component (C) in the present invention is a compound having the following three functions.

(1) The compound reacts preferentially with water present in the system and protects the composition from the influence of water.
(2) The compound reacts with an organohydroxylamine left or formed in the system to convert it to another harmless compound or compounds and the bad influences of the organohydroxylamine are eliminated.
(3) The compound acts as an adhesion-promotor and imparts a self-adhesive property to the composition.

In conventional two-pack type compositions, it is very difficult to completely remove from the aminoxy group-containing organic silicon compound (component B), the residual organohydroxylamine formed during the manufacturing step and remaining in a small amount therein. As a result, the storage stability of the component (B) is reduced and the shelf life of the product is inevitably short. In this case, by addition of a small amount of an isocyanate group-containing compound, the residual organohydroxylamine can be completely removed, and therefore, the shelf life can be remarkably prolonged. When the aminoxy group-containing organic silicon compound is diluted, increased in amount or colored by incorporation of a silicone oil or other oil, a filler or a pigment, according to the conventional technique, in order to remove water from such an additive in advance, it is necessary to perform such operations as drying, heating and kneading under reduced pressure. Also in this case, by incorporating an isocyanate group-containing compound according to the present invention, the above troublesome operations can be omitted by the above-mentioned function (1), and the function (2) is continuously exerted even after dilution, amount increase or coloration. As a result, the shelf life can be remarkably prolonged.

In the case of a one-pack type product, by the function (1), water can be removed from the starting compounds in advance, and the organohydroxylamine formed during the step of mixing the components (A) and (B) is converted to a harmless compound by the function (2). Therefore, an excellent storage characteristic can be attained. In the case of either a two-pack type product or a one-pack type product, attainment of a self-adhering property in the composition can be achieved. In a conventional composition of this type, a sufficient bonding cannot be obtained unless the substrate is treated with an appropriate primer in advance. In the present invention, a good adhesiveness can be attained even without a primer treatment, owing to incorporation of the isocyanate group-containing compound.

As the isocyanate group-containing compound that is used as the component (C) in the present invention, there can be mentioned, for example, isocyanate group-containing monomers such as

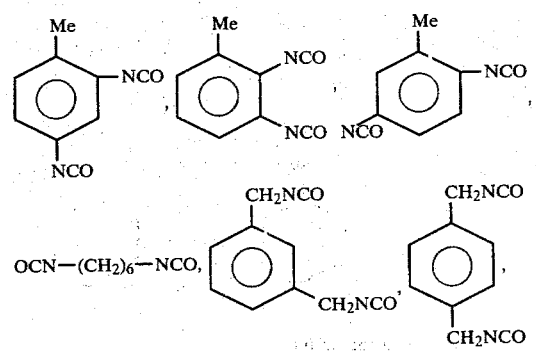

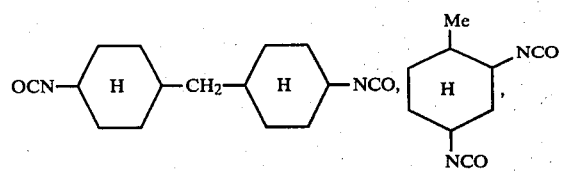
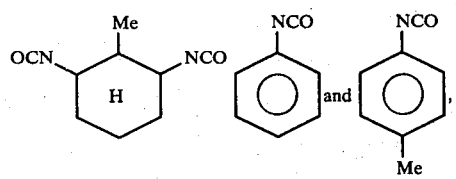
adducts such as
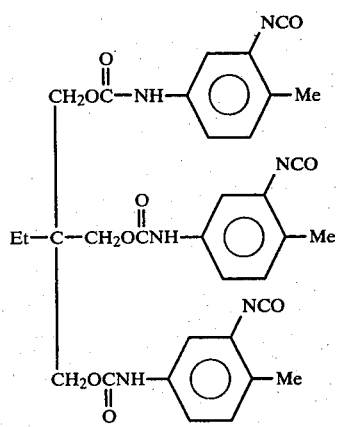
and
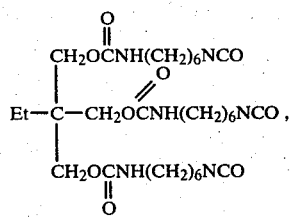
oligomers such as
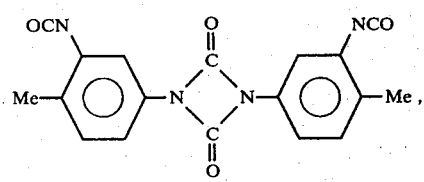
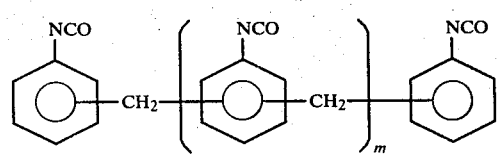
wherein m is a number of 0 to 100,

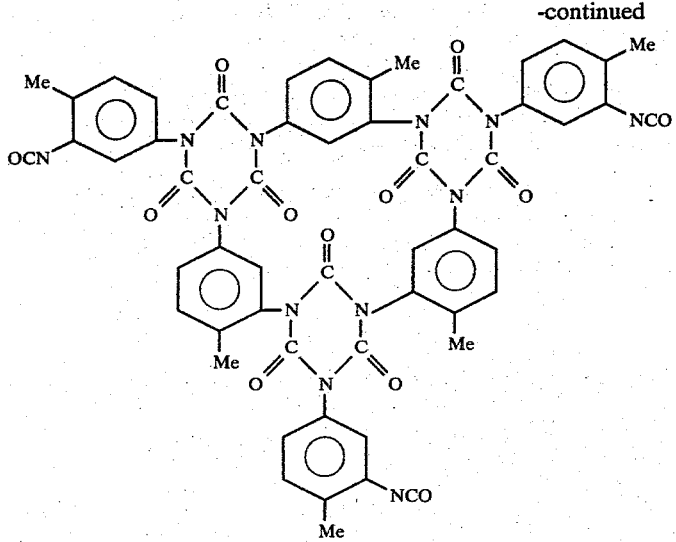

and

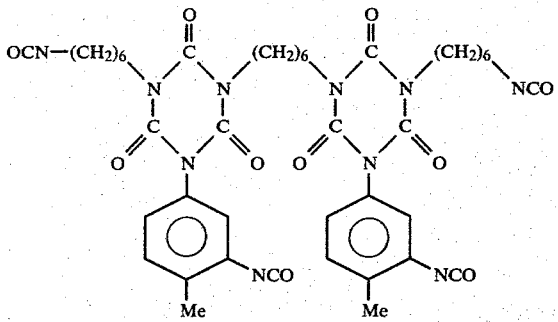

and

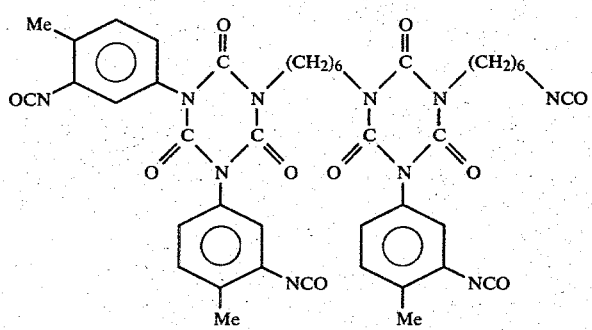

and urethane polymers such as

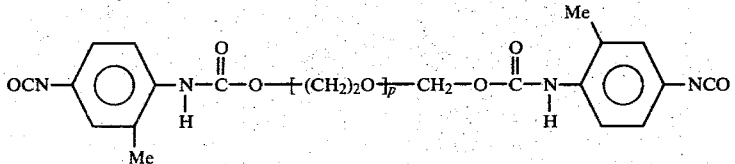

wherein p is a number of 3 to 50.

Further, isocyanate group-containing silicon compounds such as

Me₃SiNCO, Me₂Si(NCO)₂, PhSi(NCO)₃,

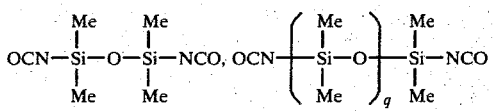

wherein q is a number of 5 to 50, and

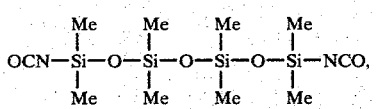

are effectively used. The reactions of such isocyanate group-containing compound with water and an organohydroxylamine (diethylhydroxylamine in the following reaction schemes) are represented by the following reaction schemes (1) and (2):

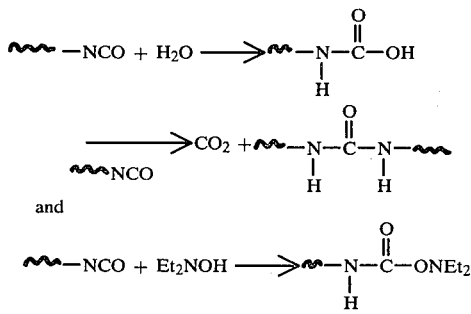

In the reaction (1), carbon dioxide is formed. It is possible to perform this reaction only during the manufacturing step in the case of either a one-pack type product or a two-pack type product, and since the influences of water can be eliminated completely by insulating the composition from contact with air after packaging, there is no risk of foaming caused by generation of carbon monoxide. Reaction (2) slowly advances during the manufacturing step and after packaging, but since the reaction product is not gaseous, there is no risk of foaming the composition. Further, this reaction product has no influence on the stability, workability and physical properties of the composition.

The isocyanate group-containing compound is incorporated in an amount of 0.001 to 20 parts by weight, preferably 0.005 to 5 parts by weight, per 100 parts by weight of the $\alpha,\omega$-dihydroxypoly(diorganosiloxane) (component A). When the amount added of the isocyanate compound is less than 0.001 part by weight, a sufficient storage stability and a sufficient adhesiveness are not imparted to the composition. When the isocyanate group-containing compound is used in an amount larger than 20 parts by weight, foaming is caused by the action of water present in air by the above reaction (1) during application, and curing is retarded by the moisture.

In order to impart appropriate flow characteristics to the composition of the present invention before curing and to impart mechanical properties required of a sealing material to the cured composition, it is preferred to incorporate a finely divided inorganic filler into the composition of the present invention. As the inorganic filler, there can be mentioned, for example, (1) reinforcing fillers such as fumed silica, calcined silica, precipitated silica, fumed titanium dioxide, and these fillers surface-treated with organochlorosilanes, polyorganosiloxanes or hexamethylsilazanes, and (2) non-reinforcing fillers such as calcium carbonate, calcium carbonate surface-treated with organic acid, diatomaceous earth, pulverized silica, aluminosilicate, magnesia and alumina. When a sealing material for construction having an especially low modulus is desired, it is preferred to use a non-reinforcing filler. The filler is incorporated in an amount of up to 500 parts by weight, preferably 1 to 300 parts by weight, especially preferably 40 to 150 parts by weight, per 100 parts by weight of $\alpha,\omega$-dihydroxypoly(diorganosiloxane) (component A). When the amount of the inorganic filler is too small, the mechanical properties are diminished, and when the amount of the inorganic filler is too large, the modulus is increased and the elongation at break is reduced.

A coloring pigment, a mildew-proofing agent, a flame retardant and other additives can be added to the composition of the present invention according to need.

The composition of the present invention retains the characteristics of a polyorganopolysiloxane composition of the hydroxylamine-releasing type, such as low modulus, low cost and high elongation, and it also has the properties required for a sealing material for multistory or ultra-multistory buildings. Still further, it has good storage stability and workability when employed in the form of either a one-pack type sealing material or a two-pack type sealing material. Moreoever, the composition of the present invention provides a sealing material having such a high adhesiveness that a primer need not be used.

More specifically, in the case of a two-pack type product, since it is possible to dilute, increase the amount of or color the component (B), the main sealing component and the curing component can be packaged in shapes and sizes suitable for mixing and the mixing ratio can easily be maintained at an appropriate level suitable for mixing. Further, since coloration with a pigment is possible, insufficient kneading or erroneous weighing during the mixing step can be conveniently detected and prevented. Moreoever, since the adhesiveness is remarkably improved, the occurrence of a fatal accident owing to insufficient adhesion caused by failure of the primer coating or an uneven primer coating can be prevented.

In the case of a one-pack type product, since the composition can be stored for a long time in the moisture-insulated state and the sealing material can be cured by the moisture present in air at the time of application, the mixing operation at the construction site can be omitted and the occurrence of troubles owing to errors at the mixing step, such as erroneous weighing and insufficient mixing, can be completely prevented. Moreover, there is attained the advantage that the operation time can be remarkably shortened. Furthermore, as in case of a two-pack type product, insufficient adhesion by failure of a primer coating can be prevented.

It has been confirmed that by the incorporation of an isocyanate group-containing compound in the composition, according to the invention, the corrosion of metals caused by conventional aminoxy-type sealing materials can be remarkably ameliorated, and especially in case of a one-pack type product, corrosion is not caused at all.

When the composition of the present invention comprises a bifunctional aminoxy group-containing organic silicon compound as the main aminoxy group-containing compound, it is very valuable as a low-modulus sealing material of the one-pack or two-pack type for use in the construction field, especially for multistory buildings. When the composition of the present invention comprises a trifunctional aminoxy group-containing organic silicon compound as the main aminoxy group-containing compound, it is very valuable as a high-modulus, high-strength sealing material for industrial use, especially in the electric industry where a non-corrosive sealing material is desired.

BRIEF DESCRIPTION OF THE DRAWING

The drawing shows a test piece used for the adhesion tensile test for sealing silicone materials. The units of the sizes shown in the drawing are mm. In the drawing, the tensile stress is applied in the direction vertical to the bonded face. In the drawing, the material bonded is identified as 1, and the silicone sealing material is identified as 2.

The present invention will now be further described in detail by reference to the following illustrative Examples, in which all references to "parts" mean parts by weight. The following abbreviations are used in these Examples for indicating physical properties.

H: hardness (JIS)
TS: tensile strength (Kgf/cm$^2$)
E: elongation (%)
MK: k % modulus (Kgf/cm$^2$)
CF: cohesive failure ratio (%)
TF: tack-free time (hours)

EXAMPLE 1

A base compound was prepared by homogeneously kneading 100 parts of α,ω-dihydroxypoly(dimethylsiloxane) having a viscosity of 3,000 cp measured at 25° C., with 65 parts of calcium carbonate. Separately, mixtures (samples 1a to 1c and comparative sample 1d) were prepared by mixing (a) a compound of the following formula:

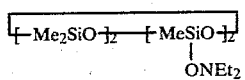

(b) a compound of the following formula:

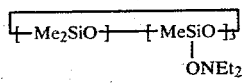

and (c) a compound of the following formula:

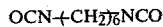

at the mixing ratios indicated in Table 1. These mixtures were charged in glass bottles, and the filled glass bottles were placed in a thermostat tank maintained at 50° C. to effect degradation under heating. After a predetermined time had passed, the bottles were taken out from the thermostat tank. Then, 3 parts of the sample mixture were added to 100 parts of the above-mentioned base composition, and the extrudability of the composition thereby formed was tested according to the method described below. Further, dumbbell specimens, as specified in JIS K-6301, were prepared and the mechanical properties were measured. The results obtained are shown in Table 1.

Extrudability Test

The composition was charged in a plastic cartridge, as specified in JIS A-5757, and the composition was extruded under a pressure of 1 Kgf/cm$^2$ by a gun attached to the cartridge. The time (seconds) necessary for extrusion of the total amount was measured (an error of ±1 second is ordinarily observed). The test was carried out at 35° C. The measurements were performed at the time when 1.5 hours had passed from the completion of mixing.

TABLE 1

| Amounts (parts) | Sample 1a | | | | Sample 1b | | | |
|---|---|---|---|---|---|---|---|---|
| Compound (a) | 94.5 | | | | 94 | | | |
| Compound (b) | 5 | | | | 5 | | | |
| Compound (c) | 0.5 | | | | 1 | | | |
| Change of Physical Properties with Lapse of Time | extrudability | H | TS | E | extrudability | H | TS | E |
| initial stage | 10″ | 13 | 11.8 | 1,390 | 9″ | 13 | 11.5 | 1,420 |
| after 0.5 month | 11″ | 13 | 12.3 | 1,350 | 10″ | 14 | 12.0 | 1,400 |
| after 1 month | 10″ | 13 | 11.9 | 1,420 | 10″ | 13 | 11.8 | 1,350 |
| after 2 months | 13″ | 15 | 11.5 | 1,250 | 9″ | 14 | 11.0 | 1,420 |
| after 3 months | 25″ | 18 | 11.0 | 1,200 | 15″ | 14 | 10.5 | 1,300 |
| Amounts (parts) | Sample 1C | | | | Comparative Sample 1d | | | |
| Compound (a) | 93 | | | | 95 | | | |
| Compound (b) | 5 | | | | 5 | | | |
| Compound (c) | 2 | | | | 0 | | | |
| Change of Physical Properties with Lapse of Time | extrudability | H | TS | E | extrudability | H | TS | E |
| initial stage | 10″ | 13 | 12.3 | 1,410 | 10″ | 13 | 12.5 | 1,400 |
| after 0.5 month | 11″ | 13 | 11.9 | 1,430 | 25″ | 17 | 10.9 | 1,100 |
| after 1 month | 11″ | 13 | 10.8 | 1,350 | 45″ | 23 | 8.5 | 930 |
| after 2 months | 10″ | 14 | 11.3 | 1,420 | measurement impossible | 30 | 6.5 | 420 |
| after 3 months | 10″ | 13 | 12.1 | 1,390 | measurement impossible | 42 | 5.3 | 320 |

EXAMPLE 2

A curing agent composition I was prepared by mixing 40 parts of α,ω-dimethylpoly(dimethylsiloxane) having a viscosity of 1,000 cp measured at 25° C., with 35 parts of powder calcium carbonate, 22.5 parts of a compound of the following formula:

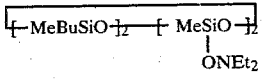

and 2.5 parts of a compound of the following formula:

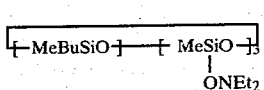

Sample mixtures 2a to 2c were prepared by mixing 100 parts of this curing agent composition I with (d) 0.5 part of tolylene diisocyanate, (e) 1 part of a compound of the following formula:

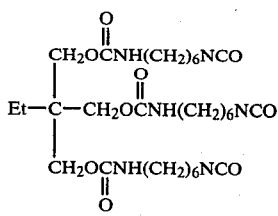

or (f) 1 part of a compound of the following formula:

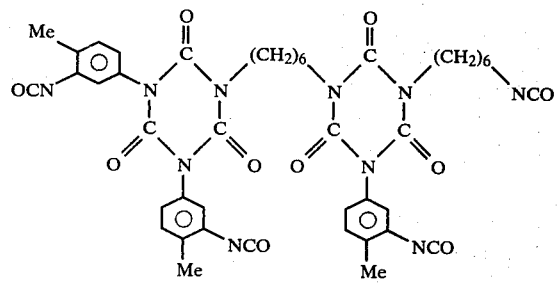

The curing agent composition I, free of compound containing an isocyanate group, was used as a comparative sample. These samples were charged in glass bottles, and the glass bottles were sealed and placed in a thermostat tank maintained at 50° C. to effect degradation under heating. When a predetermined time had passed, the bottles were taken out from the thermostat tank. Then, 10 parts of the sample were incorporated into 100 parts of the base composition used in Example 1. The extrudability and mechanical properties were determined in the same manner as described in Example 1.

The results shown in Table 2 were obtained.

Table 2

|  | Curing Agent Composition I (comparison) | | | | Sample 2a | | | |
|---|---|---|---|---|---|---|---|---|
| Isocyanate group-containing compound | not added | | | | compound (d) | | | |
| Amount (%) | 0 | | | | 0.5 | | | |
| Change of physical properties with lapse of time | extrud-ability | H | TS | E | extrud-ability | H | TS | E |
| initial stage | 15" | 14 | 11.9 | 1,250 | 14" | 14 | 12.5 | 1,300 |
| after 2 weeks | measurement | 29 | 7.0 | 630 | 13" | 14 | 11.9 | 1,250 |
| after 4 weeks | impossible | | | | 14" | 15 | 13.0 | 1,320 |
| after 6 weeks | measurement impossible | | | | 14" | 14 | 10.8 | 1,210 |
| after 8 weeks |  | | | | 15" | 14 | 12.0 | 1,330 |

|  | Sample 2b | | | | Sample 2c | | | |
|---|---|---|---|---|---|---|---|---|
| Isocyanate group-containing compound | compound (e) | | | | compound (f) | | | |
| Amount (%) | 1 | | | | 1 | | | |
| Change of physical properties with lapse of time | extrud-ability | H | TS | E | extrud-ability | H | TS | E |
| initial stage | 15" | 14 | 12.3 | 1,280 | 15" | 14 | 12.8 | 1,280 |
| after 2 weeks | 15" | 15 | 13.3 | 1,350 | 14" | 14 | 12.1 | 1,310 |
| after 4 weeks | 16" | 14 | 11.3 | 1,230 | 20" | 18 | 11.8 | "1,210 |
| after 6 weeks | 15" | 15 | 13.8 | 1,320 | 33" | 23 | 10.1 | 980 |
| after 8 weeks | 18" | 19 | 12.1 | 1,220 | 50" | 30 | 8.5 | 750 |

EXAMPLE 3

A curing agent composition II was prepared by mixing 100 parts of α,ω-divinylxypoly(dimethylsiloxane) with 45 parts of $Et_2NOMe_2SiOPh_2SiOSiMe_2ONEt_2$ and 5 parts of $MeSi(ONEt_2)_3$. Sample mixtures 3a to 3c were prepared by mixing 100 parts of this curing agent composition II with 0.1, 0.5 or 1 part of hexamethylene diisocyanate. Then, 8 parts of the respective sample mixtures were added to 100 parts of the base composition used in Example 1, and the resulting final composition was defoamed and used for formation of an H-shaped test piece as shown in the drawing. As the material to be bonded, aluminum (JIS A-5757) was used for production of the test piece. The aluminum was used after washing with methylethyl ketone, and a primer was not coated thereon. For comparison, a test piece was similarly prepared by using the curing agent composition II free of hexamethylene diisocyanate. The thus-prepared test pieces were aged at room temperature for 7 days and at 50° C. for 7 days. Then, the test pieces were cooled to room temperature and subjected to a tensile test at a pulling speed of 50 mm/min using an automatic recording tensile tester (Autograph manufactured and sold by Shimazu Seisakusho) (normal state). Separately, the aged test pieces were immersed in water maintained at 50° C. for 48 hours and then cooled to room temperature. The test pieces were immediately subjected to the above tensile test (after immersion). The results obtained are shown in Table 3.

TABLE 3

|  | Sample 3a | | | | Sample 3b | | | |
|---|---|---|---|---|---|---|---|---|
|  | $M_{150}$ | TS | E | CF | $M_{150}$ | TS | E | CF |
| Normal State | 1.5 | 5.2 | 1,200 | 100 | 1.5 | 5.3 | 1,250 | 100 |
| After Immersion | 1.4 | 3.7 | 830 | 60 | 1.4 | 5.8 | 1,330 | 100 |

|  | Sample 3c | | | | Curing Agent Composition II (comparison) | | | |
|---|---|---|---|---|---|---|---|---|
|  | $M_{150}$ | TS | E | CF | $M_{150}$ | TS | E | CF |
| Normal State | | | | | | | | |
| After | 1.5 | 4.9 | 1,210 | 100 | 1.5 | 2.7 | 350 | 0 |

TABLE 3-continued

| | | | | | | | | |
|---|---|---|---|---|---|---|---|---|
| Immersion | 1.4 | 5.5 | 1,310 | 100 | 1.3 | 1.8 | 150 | 0 |

EXAMPLE 4

A base composition was prepared by uniformly kneading 100 parts of α,ω-dihydroxypoly(dimethylsiloxane) having a viscosity of 80,000 measured at 25° C., with 150 parts of calcium carbonate powder. A comparative sample 4a was prepared by mixing and kneading 100 parts of this base composition with 2.7 parts of a compound of the following formula:

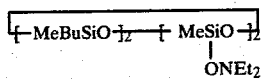

and 0.5 part of a compound of the following formula:

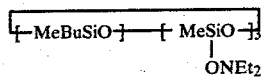

A sample 4b was obtained by mixing and kneading the components of the comparative sample 4a, together with 0.5 part of hexamethylene diisocyanate. Each sample was charged in an aluminum tube in the moisture-insulated state, and the tube was sealed. The contents were extruded into air in the form of a sheet having a thickness of 2 mm just after packing or after 3 or 6 months' storage at room temperature. The sheet was allowed to stand still for 7 days in an atmosphere maintained at a temperature of 25° C. and a relative humidity of 50% to complete curing. The physical properties of the cured sheet were determined. The results shown in Table 4 were obtained.

TABLE 4

| Change of Physical Properties with Lapse of Time | Comparative 4a | | | Sample 4b | | |
|---|---|---|---|---|---|---|
| | H | TS | E | H | TS | E |
| initial stage | 16 | 10.2 | 1,630 | 15 | 10.8 | 1,580 |
| after 3 months | 4 | 5.8 | 4,200 | 14 | 10.9 | 1,530 |
| after 6 months | not cured | | | 15 | 9.2 | 1,620 |

EXAMPLE 5

In the same manner as described in Example 4, a comparative sample 5a was prepared by mixing 100 parts of the base compound prepared in Example 4 with 2.25 parts of a compound of the following formula:

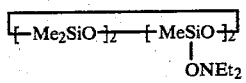

and 0.25 part of a compound of the following formula:

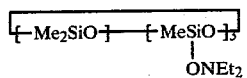

A sample 5b was prepared by mixing the components of the comparative sample 5a with 0.5 part of $Me_3SiNCO$. Each sample was charged and sealed in an aluminum tube in a moisture-insulated state and was extruded in the form of a sheet having a thickness of 2 mm just after packing or after storage in a thermostat tank maintained at 50° C. for 1 to 4 weeks. The physical properties were determined in the same manner as in Example 4. The results shown in Table 5 were obtained.

TABLE 5

| Change of Physical Properties with Lapse of Time | Comparative Sample 5a | | | | | Sample 5b | | | | |
|---|---|---|---|---|---|---|---|---|---|---|
| | viscosity (poise) | TF | H | TS | H | viscosity (poise) | TF | H | TS | E |
| initial stage | 5,730 | 6 | 14 | 8.5 | 2,100 | 6,540 | 6 | 13 | 9.7 | 2,000 |
| after 1 week | 3,620 | 12 | 8 | 6.3 | 3,500 | 6,100 | 6 | 11 | 7.0 | 2,040 |
| after 2 weeks | 890 | 48 | 4 | 5.8 | 4,300 | 6,200 | 6 | 12 | 8.7 | 1,920 |
| after 3 weeks | 320 | not cured | | | | 5,980 | 7 | 12 | 8.5 | 1,980 |
| after 4 weeks | measurement impossible | | | | | 6,020 | 7 | 12 | 7.8 | 1,950 |

EXAMPLE 6

A base composition was prepared by homogeneously kneading 100 parts of α,ω-dihydroxypoly(diorganosiloxane) having a viscosity of 50,000 cp measured at 25° C. and comprising 8 mole % of diphenylsiloxy units and 92 mole % of dimethylsiloxy units, with 100 parts of calcium carbonate powder. A sample composition was prepared by kneading 100 parts of the thus-obtained base composition with 2.75 parts of a compound of the following formula:

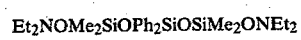

0.25 part of a compound of the following formula:

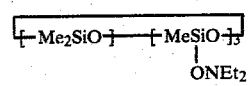

and 1 part of a compound of the following formula:

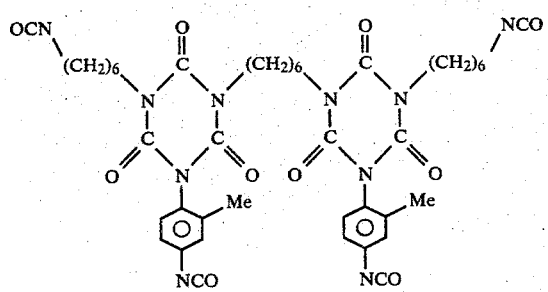

at room temperature in the closed and sealed state. Then, the composition was extruded between aluminum and glass, to bond them together, as shown in the drawing (each was only washed with toluene and no primer was coated thereon). The extrudate was allowed to stand at room temperature in air for 3 weeks to complete curing. The thus-prepared H-shaped test piece was subjected to a tensile test in the same manner as in Example 3 (normal state). Separately, the cured sample was immersed in water maintained at 70° C. for 48 hours and cooled to room temperature, and the sample was taken out from water and immediately subjected to the tensile test (after immersion). The results obtained are shown in Table 6.

TABLE 6

|  | $M_{50}$ | $M_{150}$ | TS | E | CF |
|---|---|---|---|---|---|
| Normal State | 1.4 | 1.6 | 4.9 | 1,250 | 100 |
| After Immersion | 1.4 | 1.6 | 5.1 | 1,300 | 100 |

EXAMPLE 7

A base composition was prepared by homogeneously kneading 100 parts of α,ω-dihydroxypoly(diorganosiloxane) having a viscosity of 28,000 cp measured at 25° C. and comprising 10 mole % of methyl (3,3,3-trifluoropropyl)siloxy units and 90 mole % of dimethylsiloxy units, with 40 parts of pulverized quartz and 60 parts of calcium carbonate powder. Then, 100 parts of the thus-prepared base composition was mixed and kneaded with 2.5 parts of a compound of the following formula:

and 3 parts of a compound of the following formula:

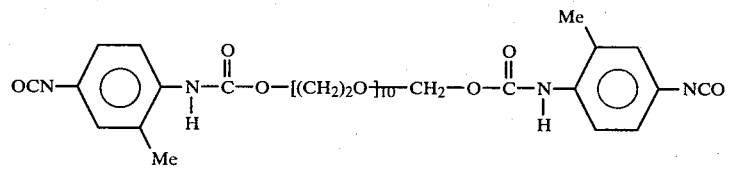

The resulting composition was charged into an aluminum tube in a moisture-insulated state and was then stored at room temperature for 3 months. Then, in the same manner as described in Example 4, a sheet having a thickness of 2 mm was prepared and the physical properties were determined. It was found that the hardness was 53 (JIS), the tensile strength was 35 Kgf/cm² and the elongation was 250%.

EXAMPLE 8

A base composition was prepared by homogeneously kneading 100 parts of α,ω-dihydroxypoly(dimethylsiloxane), with 80 parts of finely divided calcium carbonate and 3 parts of finely divided, polydimethylsiloxane-treated silica. Separately, a mixture was prepared from 90 parts of a compound of the following formula:

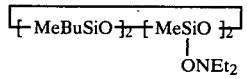

7 parts of a compound of the following formula:

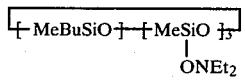

and 3 parts of hexamethylene diisocyanate. The mixture was charged in a glass bottle, placed in a thermostat tank maintained at 50° C. and taken out from the tank after passage of a predetermined time. Then, 5 parts of the mixture were added to 100 parts of the above base composition, and the extrudability and mechanical properties of the resulting composition were determined in the same manner as described in Example 1. The results shown in Table 7 were obtained.

TABLE 7

| Change of Physical Properties with Lapse of Time | extrudability | H | TS | E |
|---|---|---|---|---|
| initial stage | 8" | 13 | 6.0 | 1,810 |
| after 2 weeks | 9" | 12 | 5.7 | 1,850 |
| after 4 weeks | 8" | 12 | 4.7 | 1,760 |

EXAMPLE 9

A curing agent composition was prepared by mixing 100 parts of α,ω-dihydroxypoly(dimethylsiloxane) having a viscosity of 30,000 cp measured at 25° C., with 80 parts of finely divided calcium carbonate, 9 parts of a compound of the following formula:

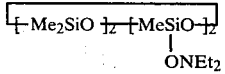

1 part of a compound of the following formula:

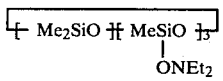

and 0.25 part of a compound of the following formula:

A base composition was prepared by kneading 100 parts of the above-mentioned α,ω-dihydroxypoly(dimethylsiloxane) with 80 parts of finely divided calcium carbonate. Equal amounts of the curing agent composition and the base composition were mixed together, and the resulting mixture was defoamed, molded into a sheet having a thickness of 2 mm, and cured. The mechanical properties of the sheet were determined according to the methods specified in JIS K-6301. It was found that the hardness was 15, the elongation was 1300% and the tensile strength was 13.5 Kgf/cm². When the mixture of the curing agent composition and the base composition were sealed in an aluminum vessel in the moisture-insulated state, allowed to stand still at room temperature for 4 weeks and extruded into air in the form of a sheet, there was obtained a rubbery elastomer having physical properties similar to those described above.

The embodiments of the invention in which an exclusive property or privilege is claimed are defined as follows:

1. A room temperature curable polyorganosiloxane composition which consists essentially of (A) 100 parts by weight of α,ω-dihydroxypoly(diorganosiloxane) having the formula:

$$HO(R^1{}_2SiO)_nH$$

wherein $R^1$ is a monovalent substituted or unsubstituted hydrocarbon group and the $R^1$ groups can be the same or different, and n is a number such that said α,ω-dihydroxypoly(diorganosiloxane) has a viscosity of 20 to 1,000,000 measured at 25° C., (B) 0.1 to 30 parts by weight of aminoxy group-containing organic silicon compound having at least two organoaminoxy groups on the average in the molecule, and (C) 0.001 to 20 parts by weight of compound having at least one isocyanate group in the molecule.

2. A composition as set forth in claim 1 wherein $R^1$ is methyl.

3. A composition as set forth in claim 1 wherein the organo moiety of the organoaminoxy group of the component (B) is ethyl.

4. A composition comprising a composition as set forth in claim 1 having incorporated therein, up to 500 parts by weight of an inorganic filler.

5. A composition as set forth in claim 1 wherein $R^1$ is selected from the group consisting of methyl, ethyl, propyl, butyl, vinyl, phenyl, chloromethyl, cyanoethyl and 3,3,3-trifluoropropyl.

6. A composition as set forth in claim 5 wherein at least 85% of the $R^1$ groups are methyl.

7. A composition as set forth in claim 1 wherein the viscosity of component A is 100 to 100,000 cp measured at 25° C.

8. A composition as set forth in claim 1 wherein the viscosity of component A is 500 to 50,000 cp measured at 25° C.

9. A composition according to claim 1 wherein component B is capable of reacting with the terminal silanol groups of component A to release hydroxylamine and to effect cross-linking of component A and chain extension thereof.

10. A composition according to claim 5 wherein component B is selected from the group consisting of Si(ONEt₂)₄, MeSi(ONEt₂)₃, PhSi(ONMe₂)₃, PhSi(ONEt₂)₃,

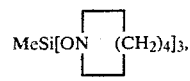

Et₂NOMe₂SiSiMe₂ONEt₂, Et₂NOMe₂SiOSiMe₂ONET₂, Et₂NOMe₂SiOPh₂SiOSiMe₂ONEt₂,

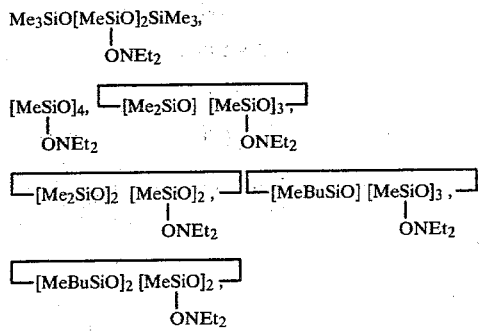

MeSi[OMe₂SiONEt₂]₃, PhSi[OMe₂SiONEt₂]₃ and mixtures thereof, wherein Me is methyl, Et is ethyl, Bu is butyl, Vi is vinyl and Ph is phenyl.

11. A composition according to claim 10, containing from 1 to 20 parts by weight of component B, per 100 parts by weight of component A.

12. A composition according to claim 10 wherein component C is selected from the group consisting of

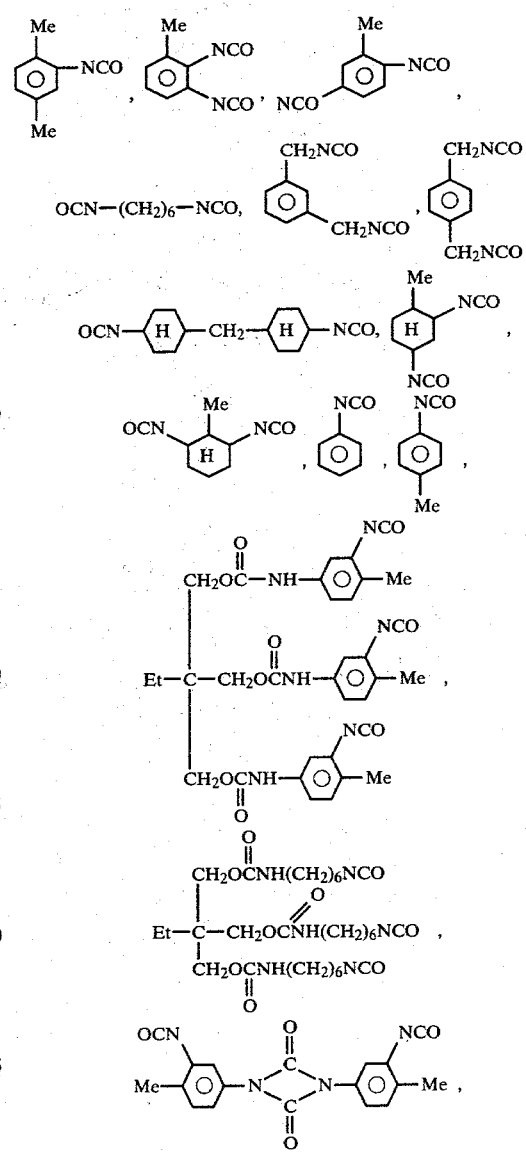

-continued

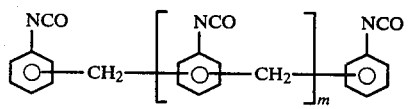

wherein m is a number of 0 to 100,

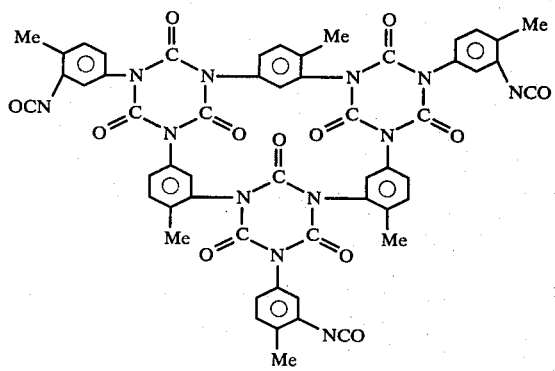

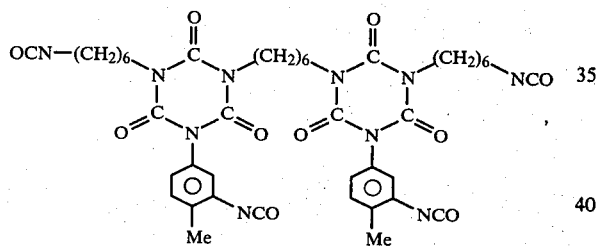

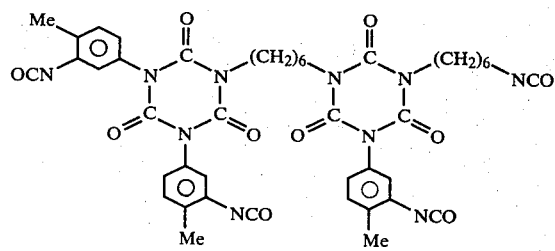

-continued

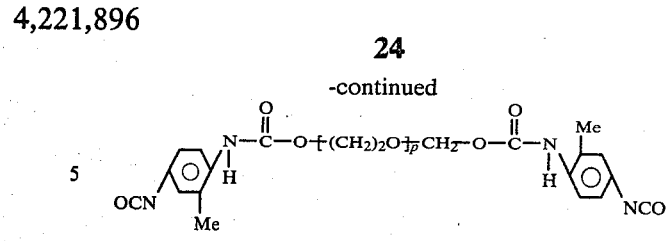

wherein p is a number of 3 to 50,
Me₃SiNCO, Me₂Si(NCO)₂, PhSi(NCO)₃,

wherein q is a number of 5 to 50, and

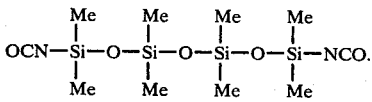

13. A composition according to claim 12, containing from 0.005 to 5 parts by weight of component C, per 100 parts by weight of component A.

14. A composition according to claim 4 wherein said inorganic filler is selected from the group consisting of fumed silica, calcined silica, precipitated silica, fumed titanium dioxide, mixtures thereof and these fillers surface treated with organochlorosilanes, polyorganosiloxanes or hexamethylsilazane.

15. A composition according to claim 4 wherein said inorganic filler is selected from the group consisting of calcium carbonate, calcium carbonate surface treated with organic acid, diatomaceous earth, pulverized silica, aluminosilicate, magnesia, alumina and mixtures thereof.

16. A composition according to claim 14 or claim 15 containing from 1 to 300 parts by weight of said filler, per 100 parts by weight of component A.

17. A composition according to claim 14 or claim 15 containing from 40 to 150 parts by weight of said filler, per 100 parts by weight of component A.

18. A unitary composition according to claim 1, packaged in two separate packages, one package containing component A and the other package containing components B and C, adapted to interact.

19. A composition according to claim 1, packaged in one package comprising a uniform mixture of components A, B and C, in a moisture-proof package.

* * * * *